US008685360B2

United States Patent
Nomura et al.

(10) Patent No.: US 8,685,360 B2
(45) Date of Patent: Apr. 1, 2014

(54) METHOD FOR THE PRODUCTION OF DIAMOND

(75) Inventors: Shinfuku Nomura, Ehime (JP); Hiromichi Toyota, Ehime (JP); Shinobu Mukasa, Ehime (JP)

(73) Assignees: Kabushiki Kaisya Toyota Jidosyokki, Aichi-ken (JP); Ehime University, Ehime-ken (JP)

( * ) Notice: Subject to any disclaimer, the term of this patent is extended or adjusted under 35 U.S.C. 154(b) by 1251 days.

(21) Appl. No.: 12/068,527

(22) Filed: Feb. 7, 2008

(65) Prior Publication Data
US 2009/0200157 A1 Aug. 13, 2009

(51) Int. Cl.
*C01B 31/06* (2006.01)
*B01J 3/06* (2006.01)
*B01J 19/12* (2006.01)

(52) U.S. Cl.
USPC ................... 423/446; 204/157.43; 204/157.4

(58) Field of Classification Search
None
See application file for complete search history.

(56) References Cited

FOREIGN PATENT DOCUMENTS

JP 2004-152523 5/2004

OTHER PUBLICATIONS

Bai, Haixin et al. Spectrophotometric Determination of Water Content in Alcohol Organic Solvents. Journal of the Chinese Chemical Society (2007) 54 619-624.*
Eaton, Sally C. et al. "Construction of a new C—H—O ternary diagram for diamond deposition from the vapor phase." Diamond and Related Materials (2000) 9 1320-1326.*
Nomura, Shinfuku et al. "Sonoplasma generated by a combination of ultrasonic waves and microwave irradiation." Applied Physics Letters (2003) 83 4503-4505.*
Matsushima, Yuta et al. "Diamond systhesis under atmospheric pressure from ethanol-water solution using hot-filament chemical vapor deposition method assisted by electrospray." Journal of Applied Physics (2005) 98 114902.*
Bachmann et al.; "Towards a General Concept of Diamond Chemical Vapour Deposition"; *Diamond Related Materials*; c. 1999; pp. 1-12.
Toyota et al.; "High-Rate Synthesis of Diamond by Plasma CVD Under Higher Pressure than Atmospheric Pressure"; *Seimitsu Kogaku Kaishi*; vol. 69, No. 10; C. 2003; pp. 1444-1448.
Hirakuri, Kenji K., et al., "Influence of the methane concentration on HF-CVD diamond under atmospheric pressure", Vacuum, vol. 63, 2001, pp. 449-454.
Hirmke, J., et al., "Improved flow conditions in diamond hot filament CVD—Promising deposition results and gas phase characterization by laser absorption spectroscopy", Vacuum, vol. 81, 2007, pp. 619-626.
Mukasa, Shinobu, et al., "Temperature distributions of radio-frequency plasma in water by spectroscopic analysis", Journal of Applied Physics, vol. 106, 2009, pp. 113302-113302-6.
Maehara, T., et al., "Degradation of Methylene Blue by RF Plasma in Water", Plasma Chem. Plasma Process, 2008, pp. 467-482.
Toyota, H., et al., "A consideration of ternary C—H—O diagram for diamond deposition using microwave in-liquid and gas phase plasma", Diamond & Related Materials, vol. 20, 2011, pp. 1255-1258.

* cited by examiner

*Primary Examiner* — Christopher A Hixson
(74) *Attorney, Agent, or Firm* — Wenderoth, Lind & Ponack, L.L.P.

(57) ABSTRACT

This invention is to provide a method for the production of diamond at a high rate and in a high efficiency using in-liquid plasma. The present invention is a method for the production of diamond using electromagnetic waves irradiated to a liquid containing carbon, hydrogen and oxygen in which the ratio of hydrogen atoms to the sum of carbon atoms and hydrogen atoms is from 0.75 to 0.82 and the ratio of carbon atoms to the sum of carbon atoms and oxygen atoms is from 0.47 to 0.58 so as to generate plasma in the liquid.

4 Claims, 4 Drawing Sheets

C-H-O diagram

METHOD FOR THE PRODUCTION OF DIAMOND

TECHNICAL FIELD

This invention relates to a method for the production of diamond.

BACKGROUND ART

With regard to a method for the formation of diamond, a high-pressure synthesis, an explosion synthesis, a gas-phase synthesis, etc. have been known (refer, for example, to Non-Patent Document 1). Among the above, a gas-phase synthesis was invented in the sixtieth and improvements have been carried out up to now. In the Non-Patent Document 2, there is a description that diamond of several μm is formed on a plate of 300 mm×300 mm. In Non-Patent Document 3, there is a description that atmospheric pressure for a gas-phase synthesis which is usually as low as 0.1 atmosphere or less is raised up to 3 atmospheres whereby a forming rate of 450 μm per hour is achieved.

In the Patent Document 1, there is a description that a diamond-like film is formed at the rate of 150 μm per minute using in-liquid plasma means.

[Non-Patent Document 1] "Thin Film of Diamond" by Sugao Otsuka; edited by the Japanese Surface Science Society; published by Kyoritsu Shuppan
[Non-Patent Document 2] Tsukawa, *New Diamondo*, Vol. 73 (2004), page 16
[Non-Patent Document 3] Hiromichi Toyota, *Seimitsu Kogaku Kaishi*, Vol. 69, No. 10 (2003), pages 1444 to 1448
[Patent Document 1] Gazette of Japanese Patent Laid-Open No. 2004-152523

DISCLOSURE OF THE INVENTION

Problems that the Invention is to Solve

In the high-pressure synthesis and the explosion synthesis mentioned in Non-Patent Document 1, apparatuses therefor are in a large scale and cost for the manufacture is high whereby they are not suitable for industrial application. In the gas-phase synthesis, the formation rate is slow and, usually, not higher than 10 μm per hour. In the method of Non-Patent Document 2 for example, although diamond is able to be formed on a wide area, it is as slow as 1 μm during 20 hours. In the method of Non-Patent Document 3, although a longitudinal growth rate is high, its forming region is narrow (diameter: 2 mm).

According to the method using in-liquid plasma mentioned in Non-Patent Document 1, the forming rate is high and a diamond-like film is able to be formed even on a substrate which is weak against heat. Accordingly, there has been a demand for an art where diamond is able to be produced by means of in-liquid plasma.

An object of this invention is to provide a method for the production of diamond at a high rate and in a high efficiency using in-liquid plasma.

Means for Solving the Problems

In order to solve the above problems, the present invention relates to a method for the production of diamond, characterized in that, electromagnetic wave is irradiated to a liquid containing carbon, hydrogen and oxygen in which the ratio of hydrogen atoms to the sum of carbon atoms and hydrogen atoms is from 0.75 to 0.82 and the ratio of carbon atoms to the sum of carbon atoms and oxygen atoms is from 0.47 to 0.58 so as to generate plasma in the liquid whereby diamond is produced. With regard to the liquid, a liquid which contains methanol may be used and ethanol and water may be further added thereto.

Advantages of the Invention

The method for the production of diamond in accordance with this invention has an advantage that, by means of in-liquid plasma, diamond is able to be produced at a high forming rate in a simple apparatus.

BEST MODE FOR CARRYING OUT THE INVENTION

The best mode for carrying out this invention will be illustrated by referring to the drawings. FIG. 1 is a schematic drawing which shows an example of an apparatus for the production of diamond.

An apparatus 1 for the production of diamond has a container 2 in which a liquid 3 is placed, an antenna 4 which irradiates electromagnetic wave to the liquid 3 and a device 5 for providing high frequency which provides high frequency to the antenna 4. A quartz container having 55 mm inner diameter and 83 mm height was used as the container 2.

The antenna 4 has a copper wire 6 as its inner core and the outer circumference of the copper wire 6 is covered with an alumina coat which is an insulating material 7. A tungsten chip 8 is attached to the front end of the copper wire 6. In the inner area of the container 2, a material 10 for holding a substrate which holds the substrate 9 is installed.

The device 5 for providing high frequency provides high frequency to the antenna 4. Here, microwave of 2.45 GHz is used as electromagnetic wave. The microwave provided by a device 11 for generation of high frequency is introduced into a rectangular resonator 14 via a waveguide 12 and a window 13 for bonding. An end of the copper wire 6 which is a monopole antenna is inserted into the rectangular resonator 14. A waveguide of a WRJ-2 type was used as the waveguide 12 and the rectangular resonator 14 in a size of 110 mm×30 mm×164 mm was used.

The apparatus 1 for the production of diamond is further equipped with a device 15 for heating the substrate whereby the substrate 9 is able to be heated. As the device 15 for heating the substrate, an AC power source of 11 A/60 Hz is installed and it provides alternating current to the electroconductive substrate whereby the substrate 9 is heated.

A cover 16 is able to be attached to the upper part of the container 2 and is able to tightly close the container 2. An aspirator 17 is further installed there and is able to reduce the pressure of the inside of the container 2.

Now a method for the production of diamond using the apparatus 1 for the production of diamond will be illustrated. A liquid 3 containing carbon, hydrogen and oxygen as atoms is placed in the container 2. The ratio of hydrogen atom numbers to the sum of the carbon atom numbers and the hydrogen atom numbers is from 0.75 to 0.82 and the ratio of carbon atom numbers to the sum of the carbon atom numbers and the oxygen atom numbers is from 0.47 to 0.58. FIG. 2 is a diagram which shows the constituting ratios among carbon atom numbers, hydrogen atom numbers and oxygen atom numbers. The line 1 shows that the ratio of hydrogen atom numbers to the sum of carbon atom numbers and hydrogen atom numbers is 0.75 while the line 2 shows that the ratio of hydrogen atom numbers to the sum of carbon atom numbers and hydrogen atom numbers is 0.82. The line 3 shows that the ratio of carbon atom numbers to the sum of carbon atom numbers and oxygen atom numbers is 0.75 while the line 4 shows that the ratio of carbon atom numbers to the sum of carbon atom numbers and oxygen atom numbers is 0.58. Accordingly, the liquid corresponding to the area surrounded by the lines 1, 2, 3 and 4 is selected.

The substrate 9 is installed in the material 10 for holding the substrate. Here, an n-type silicon wafer of 30 mm length, 6 mm width and 0.6 mm thickness is used as the substrate. The substrate 9 is placed in the liquid 3 at a position about 2 mm apart from the front end of the antenna 4. Surface of the silicon wafer is previously flawed by diamond powder and then well subjected to an ultrasonic treatment with acetone so that the diamond powder is removed. The pressure in the inside of the container 2 is adjusted to 40 kPa using an aspirator. The silicon wafer substrate 9 is heated to about 800° C. by applying alternating current of 11 A/60 Hz from an AC power source (the device 15 for heating the substrate).

Microwave of 300 W/2.45 GHz is introduced into the rectangular resonator 14 via a window 13 for bonding from a waveguide 12. This microwave is irradiated into the liquid 3 by the antenna 4. As a result, plasma is generated near the front end of the antenna. The conductor in the inner area of the antenna 4 is covered with an insulating material except the front end whereby there is formed such a structure that the surface current generated by the microwave does not leak into the liquid but energy is effectively provided to the plasma. The uncovered front end is attached with a tungsten chip so that it is not melted upon contacting to the plasma.

Foams of vapor of the liquid are generated around the front end of the antenna 4 and the substrate 9. The state where the plasma generated in the liquid is contacted to the substrate 9 is maintained for about 10 minutes. As such, a diamond film is formed on the substrate.

EXAMPLES

Now the Examples of this invention will be illustrated. In the Examples, liquids of the following mixture ratios by volume were used.

Example 1: methanol (90) and ethanol (10)
Example 2: methanol (90), ethanol (10) and water (2)
Example 3: methanol (90), ethanol (10) and water (5)

Further, the following liquids were used as Comparative Examples.

Comparative Example 1: ethanol only
Comparative Example 2: methanol (90), ethanol (10) and water (40)

The liquids of from Example 1 to Example 3 are those within the range of conditions for the liquid of the present invention while the liquids of Comparative Example 1 and Comparative Example 2 are those which are out of the range of condition for the liquid of the present invention. Constitution of each of the liquids is also shown in FIG. 2.

Plasma was generated in each of the liquids to form a film on the silicon wafer substrate. Raman shift of the formed film was measured and the result is shown in FIG. 3 to FIG. 6.

FIG. 3 is a graph which shows the spectrum of the Raman shift of the film concerning Example 1. A clear peak is noted at the position of 1333 $cm^{-1}$ and it is found that the formed film is a diamond film. With regard to the film formed in Example 1, its elasticity and hardness were also measured. Although there were some variations in the measured values, there is included the data both in elasticity and hardness far beyond the range of a diamond-like carbon film (DLC) and such high elasticity and hardness can be expected only for diamond. Further, when an observation was conducted under a scanning electron microscope (SEM), particles in a size of about 1 μm were observed and found to be fine diamonds in a size of a nano-level.

FIG. 4 is a graph which shows the spectrum of the Raman shift of the film concerning Example 2 and FIG. 5 is a graph which shows the spectrum of the Raman shift of the film concerning Example 3. In each of those graphs, a peak showing diamond is also noted at the position of 1330 $cm^{-1}$.

FIG. 6 is a graph which shows the spectrum of the Raman shift of the film concerning Comparative Example 1. In Comparative Example 1, no peak showing diamond is noted. In Comparative Example 2, although generation of plasma was observed, only a faint white trace remained on the substrate and anything which was recognized to be a film was not formed.

Since diamond is synthesized by generation of plasma in a liquid, the synthetic rate is higher as compared with a gas-phase synthesis. In the above Examples, the formation rate of a diamond film was also as high as about 20 μm per hour.

INDUSTRIAL APPLICABILITY

In accordance with the method for the production of diamond of this invention, it is now possible to synthesize diamond at a very high rate although the apparatus and the operation therefor are simple. It is able to be widely utilized, for example, as an art for conducting the formation of diamond film at a low cost and in a large amount.

Figure 1:
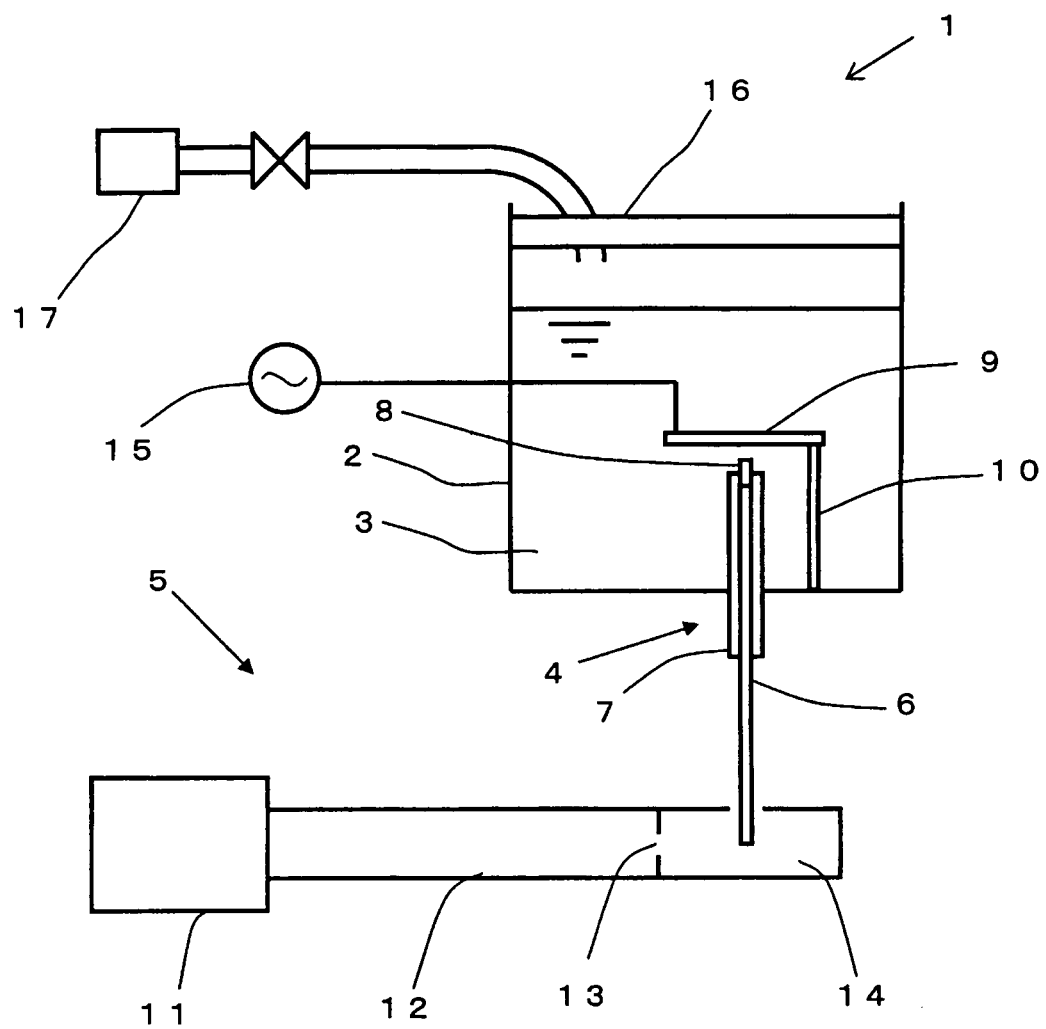
FIG. 1 This is a schematic drawing which shows an example of an apparatus for the production of diamond.
Figure 2:
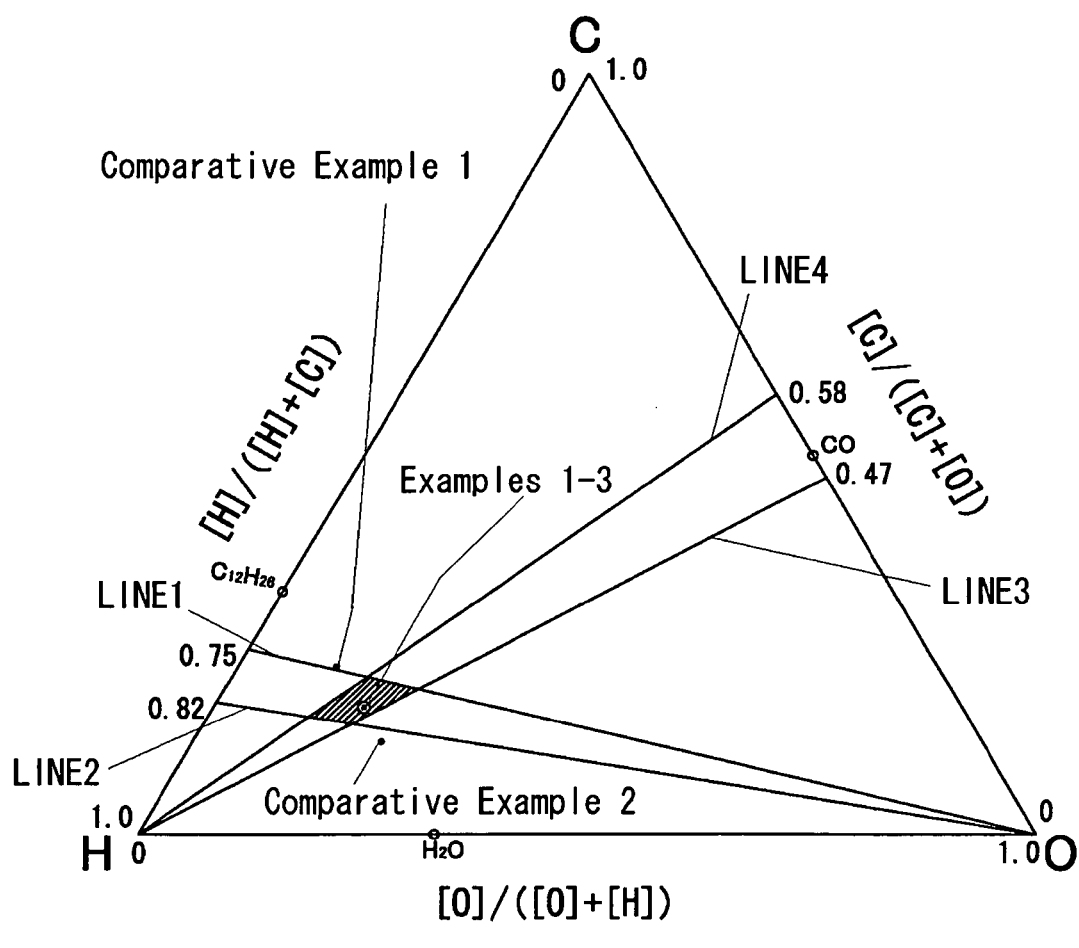
FIG. 2 This is a diagram which shows the constituting ratio among carbon atom numbers, hydrogen atom numbers and oxygen atom numbers.
Figure 3:
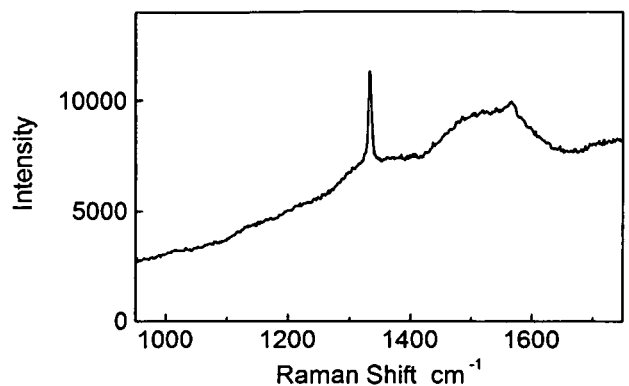
FIG. 3 This is a graph which shows a spectrum of Raman shift of the film according to Example 1.
Figure 4:
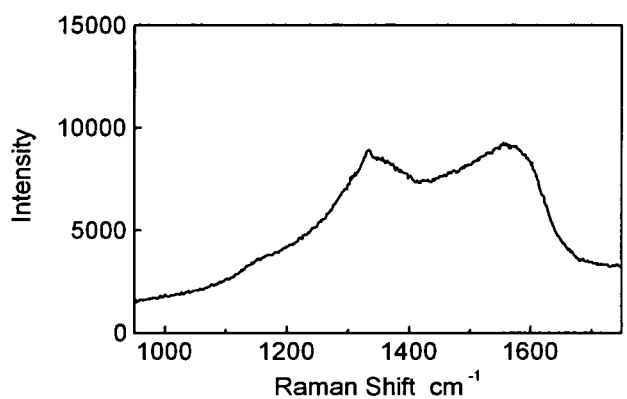
FIG. 4 This is a graph which shows a spectrum of Raman shift of the film according to Example 2.
Figure 5:
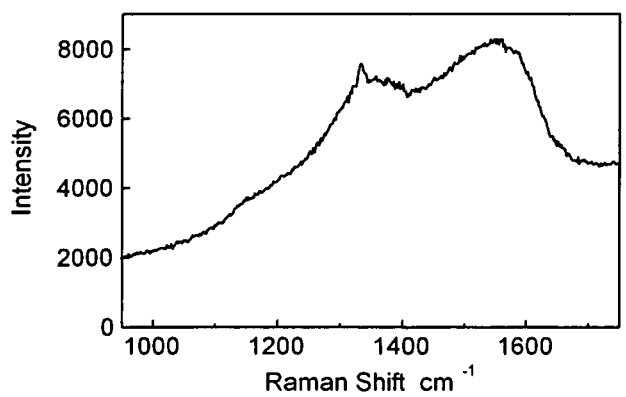
FIG. 5 This is a graph which shows a spectrum of Raman shift of the film according to Example 3.
Figure 6:
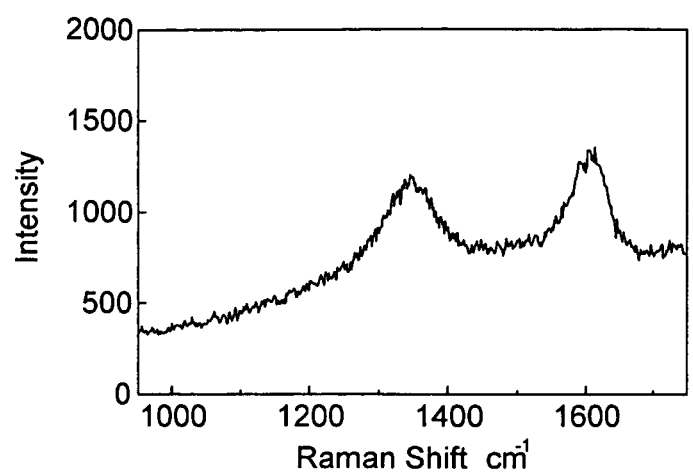
FIG. 6 This is a graph which shows a spectrum of Raman shift of the film according to Comparative Example 1.

EXPLANATION OF REFERENCE NUMERALS 1 apparatus for the production of diamond
2 container
3 liquid
4 antenna
5 device for providing high frequency
6 copper wire
7 insulating material (alumina coat)
9 substrate
10 material for holding a substrate
15 device for heating a substrate (AC power source)
17 aspirator

The invention claimed is:
1. A method for the production of diamond, which comprises:
   providing a liquid containing methanol, carbon atoms, hydrogen atoms and oxygen atoms, in which
   (a) the ratio of hydrogen atoms to the sum of carbon atoms and hydrogen atoms is from 0.75 to 0.82, and

(b) the ratio of carbon atoms to the sum of carbon atoms and oxygen atoms is from 0.47 to 0.58, and subjecting the liquid only to electromagnetic wave irradiation to generate plasma in the liquid, wherein the diamond is produced.

2. The method for the production of diamond according to claim 1, wherein the liquid further contains ethanol.

3. The method for the production of diamond according to claim 1, wherein the liquid further contains water.

4. The method for the production of diamond according to claim 2, wherein the liquid further contains water.

\* \* \* \* \*